United States Patent
Gao et al.

(10) Patent No.: US 10,127,652 B2
(45) Date of Patent: Nov. 13, 2018

(54) DEFECT DETECTION AND CLASSIFICATION BASED ON ATTRIBUTES DETERMINED FROM A STANDARD REFERENCE IMAGE

(71) Applicant: KLA-Tencor Corporation, Milpitas, CA (US)

(72) Inventors: Lisheng Gao, Morgan Hill, CA (US); Avijit K. Ray-Chaudhuri, San Ramon, CA (US); Raghav Babulnath, San Jose, CA (US); Kenong Wu, Davis, CA (US)

(73) Assignee: KLA-Tencor Corp., Milpitas, CA (US)

( * ) Notice: Subject to any disclaimer, the term of this patent is extended or adjusted under 35 U.S.C. 154(b) by 361 days.

(21) Appl. No.: 14/612,192

(22) Filed: Feb. 2, 2015

(65) Prior Publication Data

US 2015/0221076 A1    Aug. 6, 2015

Related U.S. Application Data

(60) Provisional application No. 61/936,330, filed on Feb. 6, 2014.

(51) Int. Cl.
*G06K 9/00* (2006.01)
*G06T 7/00* (2017.01)

(52) U.S. Cl.
CPC .... *G06T 7/001* (2013.01); *G06T 2207/10024* (2013.01); *G06T 2207/10061* (2013.01); *G06T 2207/30148* (2013.01)

(58) Field of Classification Search
CPC ........... G06T 7/001; G06T 2207/10024; G06T 2207/10061; G06T 2207/30148
See application file for complete search history.

(56) References Cited

U.S. PATENT DOCUMENTS

| | | | | |
|---|---|---|---|---|
| 5,640,200 A | * | 6/1997 | Michael | G06T 7/001 348/126 |
| 5,777,729 A | * | 7/1998 | Aiyer | G01N 21/4788 356/237.1 |

(Continued)

FOREIGN PATENT DOCUMENTS

| | | |
|---|---|---|
| CN | 102129164 | 7/2011 |
| JP | 2004-212218 | 7/2004 |

OTHER PUBLICATIONS

Bourgeat et al., "Content-based segmentation of patterned wafer for automatic threshold determination," SPIE 5011, Machine Vision Applications in Industrial Inspection XI, May 22, 2003, 7 pages.

(Continued)

*Primary Examiner* — Gregory M Desire
(74) *Attorney, Agent, or Firm* — Ann Marie Mewherter (57) ABSTRACT

Systems and methods for classifying defects detected on a wafer are provided. One method includes detecting defects on a wafer based on output generated for the wafer by an inspection system. The method also includes determining one or more attributes for at least one of the defects based on portions of a standard reference image corresponding to the at least one of the defects. The method further includes classifying the at least one of the defects based at least in part on the one or more determined attributes.

53 Claims, 6 Drawing Sheets

(56) References Cited

U.S. PATENT DOCUMENTS

| | | | | |
|---|---|---|---|---|
| 5,850,466 | A * | 12/1998 | Schott | G06K 9/6203 382/141 |
| 6,850,321 | B1 * | 2/2005 | Yu | G03F 1/84 356/237.4 |
| 7,162,073 | B1 * | 1/2007 | Akgul | G01N 21/8851 348/125 |
| 7,330,248 | B2 * | 2/2008 | Sakai | G01N 21/94 250/559.45 |
| 7,598,490 | B2 * | 10/2009 | Kurihara | G01N 21/9501 250/306 |
| 7,676,077 | B2 | 3/2010 | Kulkarni et al. | |
| 8,000,922 | B2 | 8/2011 | Chen et al. | |
| 8,045,145 | B1 * | 10/2011 | Bakker | G01N 21/95607 356/237.1 |
| 8,126,255 | B2 | 2/2012 | Bhaskar et al. | |
| 8,139,843 | B2 | 3/2012 | Kulkarni et al. | |
| 8,204,296 | B2 | 6/2012 | Bhaskar et al. | |
| 8,401,272 | B2 * | 3/2013 | Amanullah | G01N 21/9501 382/145 |
| 8,559,001 | B2 | 10/2013 | Chang et al. | |
| 8,669,523 | B2 | 3/2014 | Chen et al. | |
| 8,923,600 | B2 | 12/2014 | Zafar et al. | |
| 2002/0051565 | A1 * | 5/2002 | Hiroi | G01N 21/95607 382/149 |
| 2002/0181757 | A1 * | 12/2002 | Takeuchi | G06T 7/001 382/149 |
| 2007/0133860 | A1 | 6/2007 | Lin et al. | |
| 2007/0156379 | A1 * | 7/2007 | Kulkarni | H01L 21/67005 703/14 |
| 2008/0067371 | A1 | 3/2008 | Kurihara et al. | |
| 2008/0167829 | A1 * | 7/2008 | Park | G01N 21/8851 702/81 |
| 2009/0080759 | A1 | 3/2009 | Bhaskar et al. | |
| 2010/0074516 | A1 * | 3/2010 | Kawaragi | G01N 21/956 382/149 |
| 2010/0208979 | A1 | 8/2010 | Abbott et al. | |
| 2011/0286656 | A1 | 11/2011 | Kulkarni et al. | |
| 2012/0141013 | A1 | 6/2012 | Gao et al. | |
| 2015/0221076 | A1 * | 8/2015 | Gao | G06T 7/001 382/149 |

OTHER PUBLICATIONS

International Search Report for PCT/US2015/014682 dated May 28, 2015.

* cited by examiner

DEFECT DETECTION AND CLASSIFICATION BASED ON ATTRIBUTES DETERMINED FROM A STANDARD REFERENCE IMAGE

BACKGROUND OF THE INVENTION

1. Field of the Invention

The present invention generally relates to systems and methods for detecting and classifying defects on semiconductor wafers based on one or more attributes determined from a standard reference image.

2. Description of the Related Art

The following description and examples are not admitted to be prior art by virtue of their inclusion in this section.

Inspection processes are used at various steps during a semiconductor manufacturing process to detect defects on wafers to promote higher yield in the manufacturing process and thus higher profits. Inspection has always been an important part of fabricating semiconductor devices such as ICs. However, as the dimensions of semiconductor devices decrease, inspection becomes even more important to the successful manufacture of acceptable semiconductor devices because smaller defects can cause the devices to fail.

A frequently-used inspection algorithm is multi-die automatic thresholding (MDAT). It calculates a difference value between test and reference images at each pixel. Two values, the difference and gray level computed from the reference image, at all pixels in an image are used to construct a two-dimensional (2D) histogram. The horizontal axis (also called the detection axis) represents values of differences between test and references. The vertical axis (also called the segmentation axis) represents values of gray levels constructed from images of neighboring dies. The user can divide the values along the vertical axis into multiple segments and specify different thresholds for values in the horizontal axis. Pixels having larger difference values than the threshold values are considered to be defective pixels by MDAT. Due noise and process variation, the gray level distribution in the vertical axis may be different from one die to another die. Pixels belonging to one segment in one die may belong to another segment on another die. This problem causes unstable inspection and inconsistent inspection results. Some defect attributes calculated from reference images are also different due to variation of the gray level value distribution. Thus, the defect classification based these attributes is affected.

Figure 9:
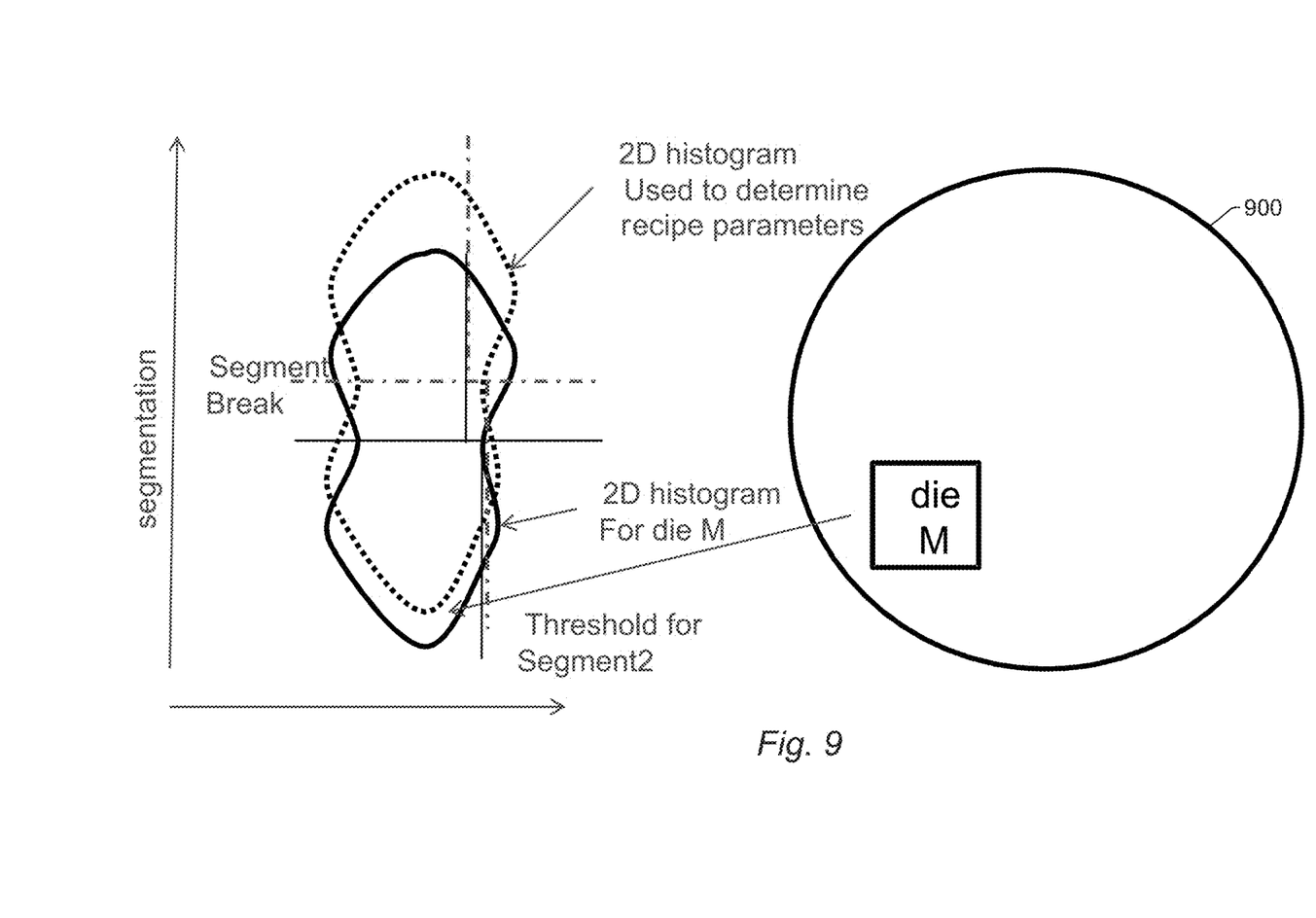
FIG. 9 is a schematic diagram illustrating problems with existing methods of defect detection.

FIG. 9 illustrates the problem with the existing MDAT algorithm described above. In particular, FIG. 9 illustrates two 2D histograms generated with the horizontal axis representing the difference values described above and the segmentation axis representing the values of the gray levels described above. One of the histograms is, as shown in FIG. 9, a 2D histogram used to determine recipe parameters. The other histogram is, as shown in FIG. 9, a 2D histogram generated for die M on wafer 900. The lines shown in FIG. 9 by a combination of dashes and dots show the segment break and thresholds for each segment in the recipe. They are determined based on some data (e.g., from different areas, different wafers, etc.). However, if there is some change in image gray levels in different areas such as die M, the 2D histogram location and shape are different from the ones used for recipe setup. The solid straight lines shown in FIG. 9 show the ideal segment break and threshold for die M. The actual recipe parameters (shown by the lines made up of a combination of dashes and dots) are shifted and cause reduced inspection sensitivity. Due to wafer noise and color variation, 2D histograms for different locations could vary. Therefore, it would be advantageous to stabilize the 2D histogram location so that segmentation breaks can work across wafers and between wafers.

Some inspection methods use standard images such as standard die images to detect defects on wafers. This approach is used to qualify photo masks or reticles. If there is a defect on a single-die reticle, the defect will be printed on every die. A normal die-to-die comparison algorithm does not have good sensitivity because subtraction of two of the same defects between dies does not indicate a large difference. In order to detect this type of defect, a reference image without die-repeater defects is needed. For example, a standard die image (also commonly referred to as a "golden die" or "standard reference die") may be compared to a test die image acquired for a wafer being inspected and the results of the comparison may be input to a defect detection algorithm or method to determine if any defects are present in the test die. Such golden die images are commonly generated from a clean wafer or a few clean dies where there is no die repeater defects or die-repeaters are removed from images of the dies. This golden die image is compared to images of all dies for all wafers.

Accordingly, it would be advantageous to develop systems and methods for detecting and classifying defects on a wafer that do not have one or more of the disadvantages described above.

SUMMARY OF THE INVENTION

The following description of various embodiments is not to be construed in any way as limiting the subject matter of the appended claims.

One embodiment relates to a method for detecting and classifying defects on a wafer. The method may include selecting one or more dies from one or more wafers to create a standard reference image. The method may also include creating the standard reference image. The method includes detecting defects on a wafer based on output generated for the wafer by an inspection system. The method also includes determining one or more attributes for at least one of the defects based on portions of a standard reference image corresponding to the at least one of the defects. In addition, the method includes classifying the at least one of the defects based at least in part on the one or more determined attributes. The detecting, determining, and classifying steps are performed by a computer system.

Each of the steps of the method may be further performed as described herein. In addition, the method may include any other step(s) of any other method(s) described herein. Furthermore, the method may be performed by any of the systems described herein.

Another embodiment relates to a non-transitory computer-readable medium storing program instructions executable on a computer system for performing a computer-implemented method for detecting defects on a wafer. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

An additional embodiment relates to a system configured to classify defects detected on a wafer. The system includes an inspection subsystem configured to generate output for a wafer by scanning light over the wafer and detecting light from the wafer during the scanning. The system also includes a computer subsystem configured for performing the detecting, determining, and classifying steps of the method described above. The system may be further configured as described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a method for classifying defects detected on a wafer. As will be described further herein, the embodiments utilize standard reference image(s) for defect detection and/or classification and may be used for applications such as improving wafer inspection recipe stability. As described further herein, the embodiments can be used to create content for the segmentation axis using a standard reference die image. If defect detection and classification use a single image to define the content of the segmentation axis, the segmentation axis will not be affected by die-to-die or wafer-to-wafer color variation.

In one embodiment, the wafer and at least one other wafer were subject to the same one or more processes prior to being inspected with an inspection system, and output of the inspection system for the wafer and the at least one other wafer have variations in color. In another embodiment, output for the wafer generated by an inspection system has variations in color across the wafer. In this manner, the embodiments described herein may be used for wafers that have color variation in the output of the inspection system from wafer-to-wafer or across a single wafer. Color variation is usually caused by wafer line edge roughness, processing variation, previous-layer patterns and metal grain. Such color variation is typically unrelated to actual defects on the wafer and may instead be related to acceptable process variation from wafer-to-wafer or across a wafer. However, such color variation could reduce inspection sensitivity and cause important defects to go undetected. In addition, color variation could be detected as actual defects by an inspection system thereby producing uncertainty and inaccuracy in inspection results.

More specifically, several instances have been reported by wafer inspection system developers and users that the same inspection recipe detected a significantly different number of DOI from wafer-to-wafer that were fabricated with the same process (wafers at the same point in a wafer fabrication process). For example, the same wafer inspection process performed on different wafers on which the same processes have been performed may detect no DOIs of a particular type on one wafer and a significant presence of the DOIs of the same type on another wafer. Color and process variation have often been observed to be associated with such stability issues. Analysis has shown that reference images that are used for detection can be unstable due to such color and process variation.

Parameters of detection such as segmentation related to a reference image can, therefore, be unstable. For instance, segmentation in some defect detection algorithms determines the sensitivity used to detect defects in different locations on a wafer based on the gray level change of the image. In this manner, output generated for different portions of a die and/or different portions of a wafer can be assigned to different segments based on one or more characteristics of the output and then different detection parameter(s) can be used for defect detection in the different segments. However, with color variation, inspection system output changes from die-to-die and/or wafer-to-wafer for the same location. Therefore, the same intensity ranges can result in different segmentation in two different dies at the same die location. As such, different defect detection may be performed in the two different dies at the same die location, which can produce different defect detection results at the same die location even if the same die location in the two different dies have the same actual defect characteristics.

In this manner, such instability can have a significant impact on DOI capture even for DOI at the same location within wafer and/or within die. For instance, due to color and process variation, a DOI at one location on a wafer may be detected by a wafer inspection process but the same DOI at the corresponding location on a different, but similarly processed, wafer may not be detected even if that DOI is actually present in that location. In a similar manner, due to color and process variation, a DOI at one location in one die on a wafer can be detected by a wafer inspection process but the same DOI at the corresponding location in another die on the same wafer may not be detected even if that DOI is actually present in that corresponding location.

Reference images that are used for classification can also be unstable due to such color and process variation. Therefore, parameters of classification such as defect attributes determined at least in part from a reference image can be unstable. For example, many inspection recipes include some sort of defect classification that may be performed for applications such as nuisance filtering. A "nuisance" as that term is used herein may be defined as a defect that is detected on a wafer by wafer inspection, but that is not actually a defect. Nuisances are therefore not related to semi-conductor yield and are not interesting to semiconductor manufacturers. For instance, a "nuisance" may be a source of noise in wafer inspection system output that is erroneously detected as a defect. Therefore, separating detected defects that are actually defects present on a wafer from detected defects that are not actual defects on a wafer can be an important part of wafer inspection.

Attributes determined from reference images are commonly used in defect classification decision trees. However, if there is color variation in the reference image, the attribute calculation can become unstable. For example, due to color and process variation, the same roughness range on a wafer may be determined as substantially different reference image attributes for two different dies at the same die location. Therefore, if such reference image attributes are used for defect classification, defects located at the same within die location in two different dies may be assigned incorrect classifications or different classifications even though they may be the same type of defect or nuisance.

Accordingly, the embodiments described herein have been developed to use the standard reference images described herein to stabilize one or more parameters of defect detection (e.g., segmentation) and/or one or more parameters of defect classification (e.g., defect attribute calculation).

The method includes detecting defects on a wafer based on output generated for the wafer by an inspection system. Detecting the defects may be performed as described further herein. In addition, detecting the defects may be performed by using the output of the inspection system as input to one or more defect detection algorithm(s) such as the multiple die auto-thresholding (MDAT) algorithm that is currently available on inspection systems commercially available from KLA-Tencor, Milpitas, Calif. The output of the inspection system may include any output described herein or that can be generated by inspection systems described herein. The inspection system may be further configured as described herein.

The method may include selecting one or more dies from one or more wafers. For example, the standard die image may be created from one die which is specified by the user. If this image is not representative, the user can select multiple dies and construct the standard reference image from these die images. The user may determine which die should be selected. The standard reference image may be created as further described herein.

The method may include acquiring the output using the inspection system. For example, acquiring the output may include scanning light over the wafer and generating output responsive to light from the wafer detected by the inspection system during the scanning. In this manner, acquiring the output may include scanning the wafer. However, acquiring the output does not necessarily include scanning the wafer. For example, acquiring the output may include acquiring the output from a storage medium in which the output has been stored (e.g., by the inspection system). Acquiring the output from the storage medium may be performed in any suitable manner, and the storage medium from which the output is acquired may include any of the storage media described herein.

Detecting the defects may include constructing information for the segmentation axis. One of the examples for the axis is the median image from 8 dies. Constructing information for the segmentation axis may be further performed as described herein.

In one embodiment, detecting the defects includes determining median intensity as a function of within die position based on the output generated by the inspection system for two or more dies on the wafer, determining difference values by subtracting a characteristic of individual pixels in the output for a reference die on the wafer from the characteristic of their corresponding pixels in the output for a test die on the wafer, generating a two-dimensional (2D) scatter plot of the difference values and the median intensity corresponding to substantially the same locations, and detecting the defects based on the 2D scatter plot.

Figure 1:
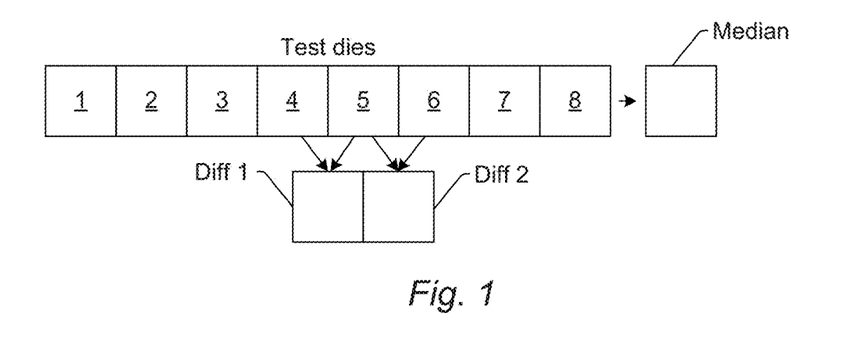
FIGS. 1-4 are schematic diagrams illustrating embodiments of different steps that may be performed for detecting defects as described herein.

In one such example, in the embodiment shown in FIG. 1, a detection job may contain image frames from 8 dies. Therefore, the test dies for this job may include test dies 1-8. The test dies shown in FIG. 1 may be dies that are adjacent to one another on a wafer, for example, in a row of dies on the wafer. However, test dies 1-8 shown in FIG. 1 may have different spatial relationships to one another on the wafer than that shown in FIG. 1. In other words, the test dies used in this embodiment do not necessarily have to be in a single row of dies on a wafer.

Determining the median intensity described above in this embodiment may include using two or more (or all) of test dies 1-8 to determine the Median die shown in FIG. 1. The median intensity may be determined as a median intensity image or may be determined in any other suitable format. The median intensity may be determined in any suitable manner using any suitable method and/or algorithm. As described further herein, such a median intensity may be used for standard reference image generation. However, as described further herein, the reference generation is not limited to median operation and can be performed using other algorithms such as a robust average, a simple average, etc. or can be created from single clean image.

The difference values described above may be determined by subtracting one of the test dies from another of the test dies. For example, as shown in FIG. 1, test dies 4 and 5 may be used to generate Diff 1, and test dies 5 and 6 may be used to generate Diff 2. Other test dies shown in FIG. 1 may be used to generate difference values in a similar manner. In this manner, the defect detection performed in this embodiment may be a die-to-die type defect detection. The characteristics of the test dies that are subtracted from each other to determine the difference values may be intensity of pixels in the output or any other suitable characteristic of the output. In this manner, determining the difference values may include determining differences between the intensity of pixels in adjacent dies. The difference values may be used to generate difference images for each of the test dies although the difference values may be expressed in any other format as a function of within die position. The difference values may be determined in any suitable manner using any suitable method and/or algorithm.

Figure 2:
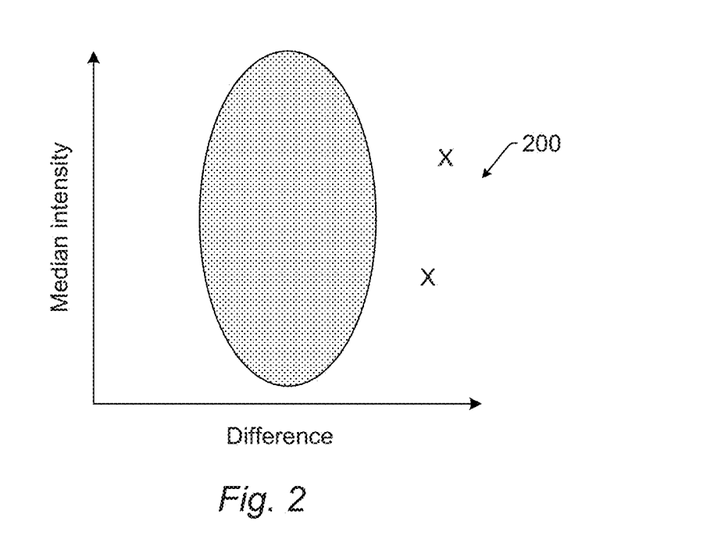

After the median intensity and difference values have been determined as described above, a 2D scatter plot such as scatter plot 200 shown in FIG. 2 may be generated. In particular, each pixel on a test image is plotted in terms of two values, the median intensity value in the vertical axis and the difference value in the horizontal axis.

The oval shaped portion of the scatter plot shown in FIG. 2 defines the boundaries between outlying scatter plot data points and non-outlying scatter plot data points. For instance, data points within the oval shaped portion may be non-outliers and data points outside of the oval shaped portion may be outliers. In this manner, the data points shown in FIG. 2 by the X's in the scatter plot may be determined to be outliers, and the locations corresponding to these data points may be identified as locations of defects on the wafer. Therefore, defects can be detected based on the 2D scatter plot.

In another embodiment, detecting the defects includes determining median intensity as a function of within die position based on a standard reference image (any of the standard reference images described further herein), combining the output for two or more test dies on the wafer, determining difference values by subtracting a characteristic of individual pixels in the standard reference image from the characteristic of their corresponding pixels in the combined output for the two or more test dies, generating a 2D scatter plot of the difference values and the median intensity corresponding to substantially the same locations, and detecting the defects based on the 2D scatter plot.

Generating the 2D scatter plot and detecting the defects in this embodiment may be performed as described above. In this manner, once the 2D scatter plot has been generated, the defect detection may be performed as described above. However, the 2D scatter plot is generated from different median intensity and difference values in this embodiment.

Figure 3:
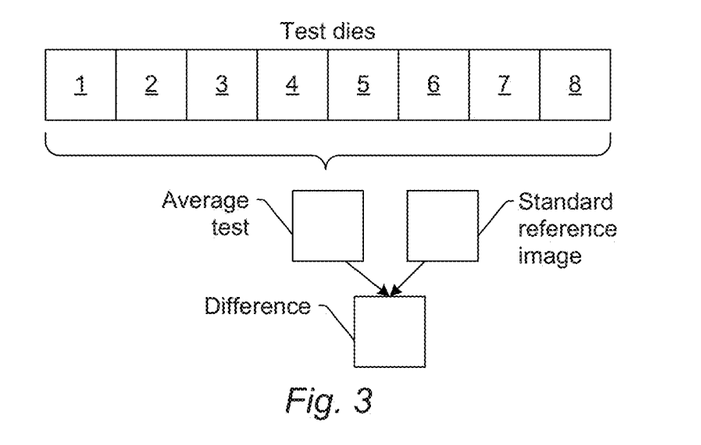

In one such example, in the embodiment shown in FIG. 3, a detection job may contain image frames from 8 dies. The test dies shown in FIG. 3 may be further configured as described herein. Combining the output for two or more test dies on the wafer in this embodiment will be described further with respect to combining the output via averaging. However, the output for the test dies may be combined in any other suitable manner. In this embodiment, output of the inspection system for test dies 1-8 shown in FIG. 3 may be used to generate the Average test die shown in FIG. 3. Generating the average test die in this embodiment may include using two or more (or all) of test dies 1-8 to determine average values of some characteristic such as intensity of the pixels in the test die images. The average test die may be determined as an average test die image or may be determined in any other suitable format. The average values of the output of multiple test dies may be determined in any suitable manner using any suitable method and/or algorithm.

The difference values described above may be determined by subtracting a standard reference die from the average test die. For example, as shown in FIG. 3, the Standard reference image may be subtracted from the Average test to generate Difference. The characteristic of the standard reference image that is subtracted from the average test image to determine the difference values may be intensity of pixels in the standard reference image and average test image or any other suitable characteristic of the images. In this manner, determining the difference values may include determining differences between the intensity of pixels in the two images. The difference values may be used to generate a difference image although the difference values may be expressed in any other format as a function of within die position. The difference values may be determined in any suitable manner using any suitable method and/or algorithm.

In these embodiments, the median intensity of the 2D scatter plot may be the intensity of the pixels in the standard reference die, and the difference values used in the 2D scatter plot may be the difference in intensity between the standard reference die and the average test. The standard reference die image used in this embodiment may include any of the standard reference images described herein.

In some embodiments, detecting the defects includes determining median intensity as a function of within die position based on the output generated by the inspection system for two or more dies on the wafer, determining difference values by subtracting a characteristic of individual pixels in the output for a reference die on the wafer from the characteristic of their corresponding pixels in the output for a test die on the wafer, separating the pixels in the output for the test die into segments determined from the standard reference image, for at least one of the segments, generating a 2D scatter plot of the difference values and the median intensity in the at least one segment corresponding to substantially the same locations, and detecting the defects based on the 2D scatter plot.

Figure 4:
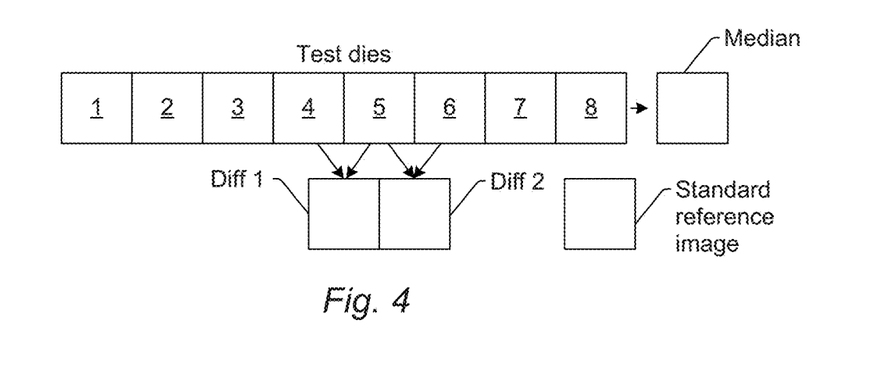

Determining the median intensity and the difference values in this embodiment may be performed as described above. In one such example, in the embodiment shown in FIG. 4, a detection job may contain image frames from 8 dies. The test dies shown in FIG. 4 may be further configured as described herein. Determining the median intensity described above in this embodiment may include using two or more (or all) of test dies 1-8 to determine the Median die shown in FIG. 4. The difference values in this embodiment may be determined by subtracting one of the test dies from another of the test dies. For example, as shown in FIG. 4, test dies 4 and 5 may be used to generate Diff 1, and test dies 5 and 6 may be used to generate Diff 2. Other test dies shown in FIG. 4 may be used to generate difference values in a similar manner. These difference values may be determined as described further herein.

After the Standard reference image shown in FIG. 4 is generated, it is aligned to the test image at corresponding die locations. Any image registration algorithm can be used to perform alignment. After the images are aligned, the difference value between the test and reference images can be calculated at each pixel. The gray-level value and this difference value at all pixels are used to create a 2D scatter plot. The user can determine segmentation and detection parameters on the 2D scatter plot.

The Standard reference image shown in FIG. 4 may then be used to determine segmentation for defect detection. The segments used in this embodiment may be determined from any of the standard reference images described herein. For example, if the standard reference image includes intensity values of pixels in the standard reference image, different ranges of the intensity values may be assigned to different segments. In one such example, intensity values from 0 to 100 may be assigned to segment 1 while intensity values from 101 to 255 may be assigned to segment 2. Other values of the pixels (e.g., median intensity values) may be used to define segments in a similar manner.

In this manner, once the segments are defined based on the standard reference image, a corresponding value (e.g., intensity, median intensity, etc.) of pixels in the test image may be compared to the values assigned to the segments to determine which of the segments to assign a pixel to. As such, different pixels can be assigned to different segments. Once the pixels have been assigned to segments, a 2D scatter plot can be generated separately for each of the segments. For instance, the median intensity and difference values corresponding to pixels in one segment may be used to generate a 2D scatter plot for that segment as described herein. Defect detection for those pixels may then be performed using that 2D scatter plot as described herein. Defect detection may then be performed for other segments in the same manner. However, since the defect detection is separately performed for different segments, one or more parameters of the defect detection performed for different segments may be different. The one or more parameters that are different for different segments may include any parameters of any defect detection algorithm and/or method.

The method also includes determining one or more attributes for at least one of the defects based on portions of a standard reference image corresponding to at least one of the defects. The one or more attributes may include any defect attributes that can be used to classify defects as described further herein. The one or more attributes may be determined from the standard reference image using any suitable method and/or algorithm.

The standard reference image may be a "golden" image created during the setup of the wafer inspection recipe. For example, the standard reference image may be generated during setup to account for process variation across wafers. In one example, the standard reference image may be generated by acquiring an image of at least one instance of a die on a wafer with the wafer inspection system. For example, during the setup step for an inspection recipe for a device/layer, the inspection system may scan a die (or several dies) and construct a standard reference image for the dies. This can be done in several ways. One could just use one instance of a die at a certain location on the wafer or, during the recipe setup, a user may designate a defect free die on the wafer.

In some embodiments, the standard reference image is not generated based on a single die on a single wafer. In an additional embodiment, the standard reference image is different than a reference image generated from a single die on a single wafer. In some embodiments, the method includes generating the standard reference image based on the output generated for the wafer by the inspection system, and the standard reference image is not used for other wafers. In a further embodiment, the method includes generating the standard reference image based on the output generated for only a portion of the wafer by the inspection system, and the standard reference image is not used for other portions of the wafer. For example, the standard reference image may be determined based on 8 median dies per wafer run time. Such a standard reference image may be generated if the variation is within wafer. In this manner, the standard reference image may be generated from multiple images acquired by the wafer inspection system corresponding to different dies on the wafer. In one such example, one can construct an "average" image or a "median" image by taking the pixel-wise average (or median) over a collection of images corresponding to different dies.

The method may include generating the standard reference image from semiconductor design data. Taking the design data which contains wafer structure information, simulation software can synthesize the wafer image of a die. The image gray-level values reflect the wafer structure information but may not be similar to the image generated from inspection machines. For example, the simplest synthetic image can be a binary image which only indicates wafer patterns and background. The advantage of using a synthetic image as the standard reference image is that the synthetic image does not contain any wafer noise and segmentation parameters derived from the synthetic image are not affected by wafer noise. In addition, the standard reference image may be the wafer design data in some embodiments. In this manner, the wafer design may be used as a standard reference image to, as described further herein, generate segments for each die on the wafer and to calculate reference attribute(s). Furthermore, the standard reference image may be an image of wafer design data for the wafer generated by a scanning electron microscope (SEM). Such a standard reference image would stabilize the segmentation as described further herein as well as the reference attribute(s). In this manner, the standard reference image may be a SEM image that is used as a proxy of the wafer design to, as described further herein, determine segments for defect detection and/or to calculate the reference attribute(s). Such a standard reference image would also stabilize the segmentation as described further herein as well as the reference attribute(s).

Generating the standard reference image from the multiple images may also include aligning the multiple images to each other with sub-pixel accuracy and processing the aligned multiple images together to thereby generate the standard reference image from the aligned images. For example, when computing an average or median image, the images that are being averaged (or whose median value is being computed) may be aligned to sub-pixel accuracy. Similar alignment may also be performed for defect detection. For example, in one embodiment, detecting the defects includes aligning multiple images to each other with sub-pixel accuracy and detecting the defects based on the aligned multiple images, which may be performed according to any of the embodiments described herein. Aligning multiple images to within sub-pixel accuracy may be performed in any suitable manner including as described in U.S. Pat. No. 7,676,077 issued to Kulkarni et al. on Mar. 9, 2010, which is incorporated by reference as if fully set forth herein. The embodiments described herein may include any step(s) of any method(s) described in this patent.

The standard reference image may be stored in the inspection recipe for use during inspection. The standard reference image may also be generated as described in commonly assigned U.S. Pat. No. 8,204,296 to Bhaskar et al. issued on Jun. 19, 2012, which is incorporated by reference as if fully set forth herein. The embodiments described herein may include any step(s) of any method(s) described in this patent and may be further configured as described in this patent.

In some embodiments, the method includes generating the standard reference image for a single die on the wafer, and the standard reference image is not used for other die on the wafer. For example, a standard reference image may be generated according to any of the embodiments described herein on a die-to-die basis. In this manner, different standard reference images may be used for different dies on the wafer.

In another embodiment, the method includes generating the standard reference image by determining one or more first histograms of one or more frame images in one or more reference images of one or more dies on the wafer, determining one or more second histograms of one or more frame images in a median image generated for the wafer from the output generated by the inspection system, modifying the one or more second histograms so that the one or more second histograms substantially match the one or more first histograms, and generating the standard reference image based on the one or more modified second histograms. In this manner, histogram modification may be used to generate a standard reference image that is used as described further herein.

Figure 5:
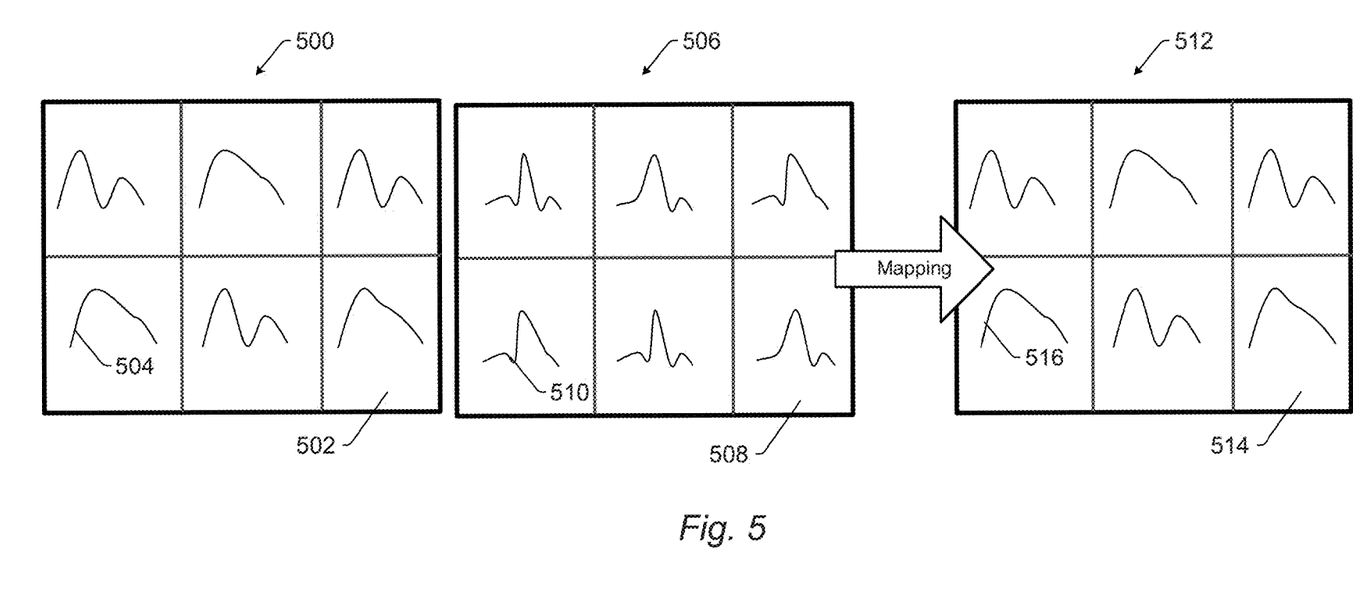
FIG. 5 is a schematic diagram illustrating an embodiment of a step that may be performed for detecting and/or classifying defects as described herein.

In one such embodiment, as shown in FIG. 5, image 500 may be a standard whole die image obtained during setup.

This image may include standard frame images 502 and histograms 504 may be determined for each of the standard frame images. During wafer inspection, image 506 that is a whole die median image may be obtained. This image may include median frame images 508, and histograms 510 may be determined for each of the median frame images. The frame images in corresponding positions in images 500 and 506 correspond to the same portions of a die on the wafer. As can be seen from comparison of histograms 504 and 510 determined for the frame images in images 500 and 506, the histograms of corresponding frame images in the different images are substantially different.

Histogram mapping may be performed on image 506 thereby producing image 512 that includes frame images 514, for which histograms 516 have been separately determined. The histogram mapping may thereby produce a mapped whole-die median image that includes a number of mapped median frame images. As such, the histograms of images 500 and 512 are matched and the images look substantially similar. In this manner, the median frame image may be made to look substantially similar to the standard reference image for all dies and wafers. If the median frame images are substantially the same for all dies and wafers, segmentation performed using such median frame images will be stable. In addition, defect attributes calculated from such standard median frame images will be stable.

In one such embodiment, the reference image is an image of a single die on the wafer. For example, during recipe setup, at least a whole die on a wafer may be scanned using an inspection system and the output generated by the inspection system during the scanning may be used to generate the reference image as described further herein. In another such embodiment, the reference image is a composite image of multiple dies on the wafer. For example, during recipe setup, multiple dies on a wafer may be scanned using an inspection system and the output generated by the inspection system during the scanning may be used to generate the reference image as described herein. In one such example, for multiple die cases, a composite image (e.g., average, median, robust average, etc.) may be generated from multiple die images. In either case, the whole die image or the composite image may be defined as the reference image and divided into frame images. A histogram may then be determined for each reference frame image and the histograms may be stored in the recipe.

In some such embodiments, detecting the defects includes assigning different portions of a test image for the wafer to different segments based on the standard reference image, and one or more parameters of the detecting step performed for the different segments are different. For example, during inspection, inspection may be performed on each frame image. A median frame image may then be created for segmentation purposes. The median frame image may be modified by mapping the histogram of the corresponding median frame image to the histogram of the standard reference frame image. Segmentation may then be performed using the median frame image as described further herein.

In a further such embodiment, determining the one or more first histograms includes generating data for the one or more first histograms, and modifying the one or more second histograms is performed with less than all of the data generated for the one or more first histograms. For example, to reduce data saved into recipes, a subset of histogram data can be saved. The minimum subset can be only the two end points of the histograms. During inspection, the median frame image may be mapped using the subset of histogram data of the standard reference image. The standard reference image effectiveness may be somewhat reduced since less information is stored into the recipe. However, if the color variation is not relatively severe, using less information may not degrade stability while the recipe size is reduced.

The method further includes classifying the at least one of the defects based at least in part on the one or more determined attributes. In one embodiment, the classifying step includes determining if the at least one of the defects is a defect of interest (DOI) or a nuisance. Classifying the defects may be performed as described further herein. In addition, classifying the defects may be performed using any suitable defect classification method and/or algorithm by replacing other defect attributes with the determined attribute(s) described herein or by modifying the method and/or algorithm so that the determined attribute(s) described herein are used in combination with other attribute(s) used by the method and/or algorithm.

Figure 6:
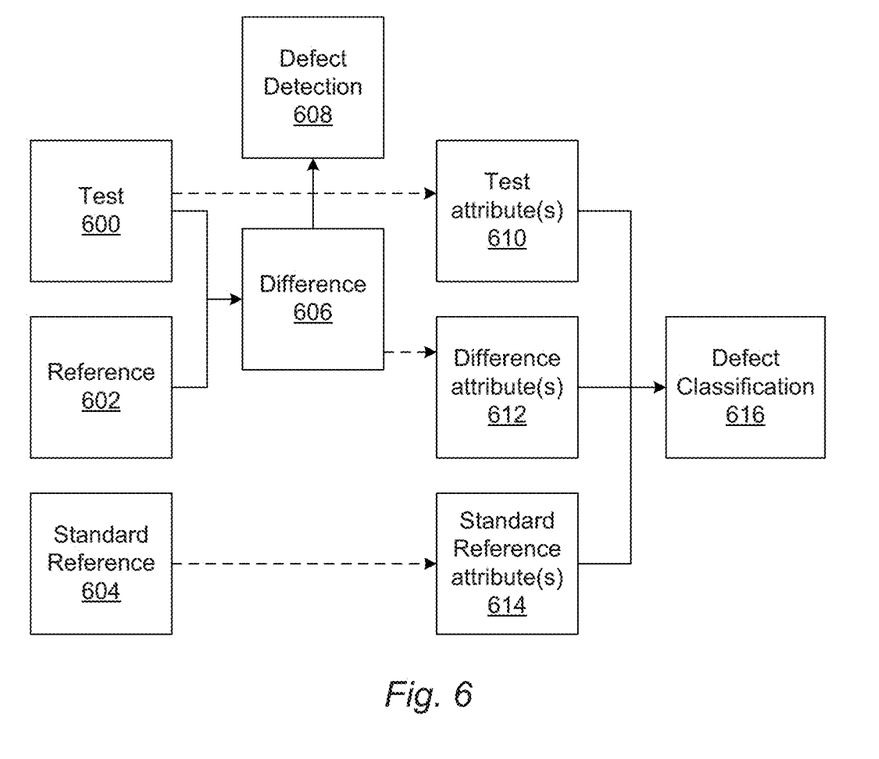
FIG. 6 is a flow chart illustrating an embodiments of steps that may be performed for detecting and/or classifying defects as described herein.

In some embodiments, the classifying step is based on the one or more determined attributes, one or more other attributes determined for the at least one of the defects based on a portion of a test image corresponding to the at least one of the defects, and one or more additional attributes determined for the at least one of the defects based on a portion of a difference image corresponding to the at least one of the defects. One such embodiment is shown in FIG. 6. In particular, as shown in FIG. 6, test image 600 and reference image 602 may be used to generate difference image 606, which may be performed as described further herein. Difference image 606 may then be used for defect detection 608, which may be performed according to any of the embodiments described herein. For any of the defects detected by the defect detection, test attribute(s) 610 may be determined from the portion of test image 600 corresponding to the defect location, difference attribute(s) 612 may be determined from the portion of difference image 606 corresponding to the defect location, and standard reference attribute(s) 614 may be determined from the portion of standard reference image 604 corresponding to the defect location. The test attribute(s), difference attribute(s), and standard reference attribute(s) may include any of the attribute(s) described herein and may be determined as described further herein. Standard reference image 604 may include any of the standard reference images described herein. As further shown in FIG. 6, test attribute(s) 610, difference attribute(s) 612, and standard reference attribute(s) 614 may be used in combination for defect classification 616.

In this manner, unlike some commonly used approaches in which defect attributes determined from a test image, a difference image, and a non-standard reference image are used for defect classification, in the embodiments described herein, a standard reference die image is used for determining attributes of defects that are then used for defect classification. Therefore, since, as described further above, the standard reference images described herein will be more stable than other commonly used reference images, the embodiments described herein provide more stable reference image defect attribute(s) for defect classification than other method and systems. In this manner, the defect classifications determined according to the embodiments described herein will be more stable and largely immune to process variation induced color variations from wafer-to-wafer and within wafer.

The classifying steps described herein may be performed by modifying a currently used defect detection algorithm and/or method to use the one or more determined attributes described herein. For example, the iDO software that is currently used by inspection systems commercially available from KLA-Tencor may be modified such that it uses at least the one or more determined attributes described herein to separate defects into different classifications.

The detecting, determining, and classifying steps described herein are performed by a computer system, which may be configured according to any of the embodiments described herein.

Each of the embodiments of the methods described above may include any other step(s) of any other method(s) described herein. Furthermore, each of the embodiments of the methods described above may be performed by any of the systems described herein.

All of the methods described herein may include storing results of one or more steps of the method embodiments in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc.

Figure 7:
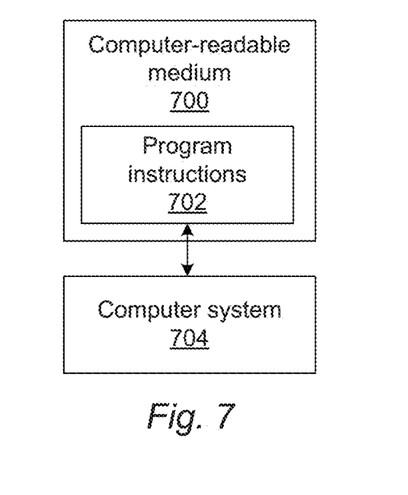
FIG. 7 is a block diagram illustrating one embodiment of a non-transitory computer-readable medium storing program instructions for causing a computer system to perform a computer-implemented method described herein.

Another embodiment relates to a non-transitory computer-readable medium storing program instructions executable on a computer system for performing a computer-implemented method for classifying defects detected on a wafer. One such embodiment is shown in FIG. 7. For example, as shown in FIG. 7, non-transitory computer-readable medium 700 stores program instructions 702 executable on computer system 704 for performing a computer-implemented method for classifying defects detected on a wafer. The computer-implemented method may include any step(s) of any method(s) described herein.

Program instructions 702 implementing methods such as those described herein may be stored on non-transitory computer-readable medium 700. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using Matlab, Visual Basic, ActiveX controls, C, C++ objects, C#, JavaBeans, Microsoft Foundation Classes ("MFC"), or other technologies or methodologies, as desired.

Computer system 704 may take various forms, including a personal computer system, mainframe computer system, workstation, system computer, image computer, programmable image computer, parallel processor, or any other device known in the art. In general, the term "computer system" may be broadly defined to encompass any device having one or more processors, which executes instructions from a memory medium.

An additional embodiment relates to a system configured to classify defects detected on a wafer. The system includes an inspection subsystem configured to generate output for a wafer by scanning light over the wafer and detecting light from the wafer during the scanning. One embodiment of such an inspection subsystem is shown in FIG. 8 as inspection subsystem 804 of system 806.

Figure 8:
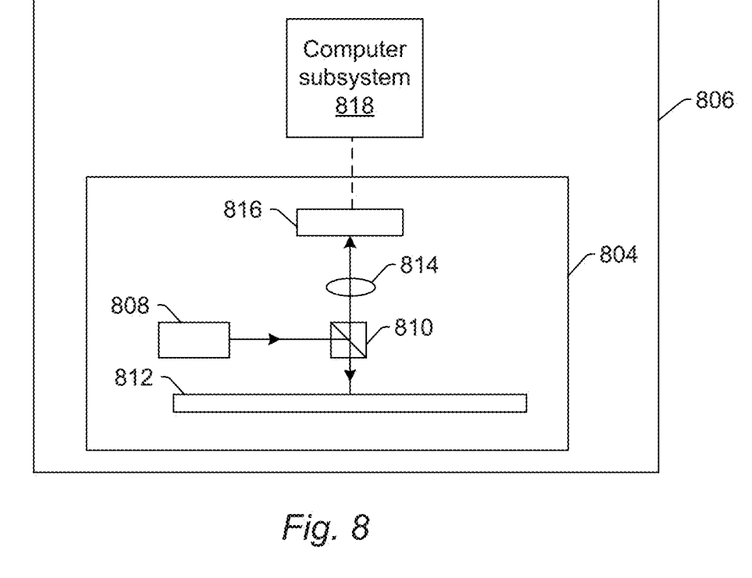
FIG. 8 is a schematic diagram illustrating a side view of an embodiment of a system configured to detect defects on a wafer.

As shown in FIG. 8, the inspection subsystem includes light source 808, which may include any suitable light source known in the art such as a broad band plasma (BBP) light source. Light from the light source may be directed to beam splitter 810, which may be configured to direct the light from the light source to wafer 812. The light source may be coupled to any other suitable elements (not shown) such as one or more condensing lenses, collimating lenses, relay lenses, objective lenses, apertures, spectral filters, polarizing components and the like. As shown in FIG. 8, the light may be directed to the wafer at a normal angle of incidence. However, the light may be directed to the wafer at any suitable angle of incidence including near normal and oblique incidence. In addition, the light or multiple light beams may be directed to the wafer at more than one angle of incidence sequentially or simultaneously. The inspection subsystem may be configured to scan the light over the wafer in any suitable manner.

Light from wafer 812 may be collected and detected by one or more detectors of the inspection subsystem during scanning. For example, light reflected from wafer 812 at angles relatively close to normal (i.e., specularly reflected light when the incidence is normal) may pass through beam splitter 810 to lens 814. Lens 814 may include a refractive optical element as shown in FIG. 8. In addition, lens 814 may include one or more refractive optical elements and/or one or more reflective optical elements. Light collected by lens 814 may be focused to detector 816. Detector 816 may include any suitable detector known in the art such as a charge coupled device (CCD) or another type of imaging detector. Detector 816 is configured to generate output that is responsive to the reflected light collected by lens 814. Therefore, lens 814 and detector 816 form one channel of the inspection subsystem. This channel of the inspection subsystem may include any other suitable optical components (not shown) known in the art. The output of the detector may include, for example, images, image data, signals, image signals, or any other output that can be generated by a detector suitable for use in an inspection system.

Since the inspection subsystem shown in FIG. 8 is configured to detect light specularly reflected from the wafer, the inspection subsystem is configured as a bright field (BF) inspection system. Such an inspection subsystem may, however, also be configured for other types of wafer inspection. For example, the inspection subsystem shown in FIG. 8 may also include one or more other channels (not shown). The other channel(s) may include any of the optical components described herein such as a lens and a detector, configured as a scattered light channel. The lens and the detector may be further configured as described herein. In this manner, the inspection subsystem may also be configured for dark field (DF) inspection.

The system also includes computer subsystem 818 that is coupled to the inspection subsystem. For example, the computer subsystem may be coupled to one or more detectors of the inspection subsystem such that the computer subsystem can receive output generated by the detector(s). In this manner, output generated by the detector(s) of the inspection subsystem may be provided to computer subsystem 818. Computer subsystem 818 is configured for detecting defects on a wafer based on the output generated for the wafer by the inspection subsystem, which may be performed according to any of the embodiments described herein. The computer subsystem is also configured for performing the determining and classifying steps described herein. Computer subsystem 818 may be configured to perform any other steps described herein.

It is noted that FIG. 8 is provided herein to generally illustrate a configuration of an inspection subsystem that may be included in the system embodiments described herein. Obviously, the inspection subsystem configuration described herein may be altered to optimize the performance of the inspection subsystem as is normally performed when designing a commercial inspection system. In addition, the systems described herein may be implemented using an existing inspection subsystem (e.g., by adding functionality described herein to an existing inspection system) such as the 29xx/28xx series of tools that are commercially available from KLA-Tencor, Milpitas, Calif. For some such systems, the methods described herein may be provided as optional functionality of the system (e.g., in addition to other functionality of the system). Alternatively, the system described herein may be designed "from scratch" to provide a completely new system.

Furthermore, although the system is described herein as being an optical or light-based inspection system, the inspection subsystem may be configured as an electron beam based inspection subsystem. The electron beam based inspection subsystem may be any suitable electron beam based inspection subsystem included in any suitable commercially available electron beam inspection system.

Further modifications and alternative embodiments of various aspects of the invention will be apparent to those skilled in the art in view of this description. For example, systems and methods for classifying defects detected on a wafer are provided. Accordingly, this description is to be construed as illustrative only and for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for classifying defects detected on a wafer, comprising:
   detecting defects on a wafer based on output generated for the wafer by an inspection system, wherein detecting the defects comprises determining median intensity as a function of within die position based on the output generated by the inspection system for two or more dies on the wafer, determining difference values by subtracting a characteristic of individual pixels in the output for a reference die on the wafer from the characteristic of their corresponding pixels in the output for a test die on the wafer, generating a two-dimensional scatter plot of the difference values and the median intensity corresponding to substantially the same locations, and detecting the defects based on the two-dimensional scatter plot;
   determining one or more attributes for at least one of the defects based on portions of a standard reference image corresponding to the at least one of the defects, wherein the standard reference image is a defect free image; and
   classifying the at least one of the defects based at least in part on the one or more determined attributes, wherein said detecting, said determining, and said classifying is performed by a computer system.

2. The method of claim 1, wherein said classifying comprises determining if the at least one of the defects is a defect of interest or a nuisance.

3. The method of claim 1, wherein the wafer and at least one other wafer were subject to the same one or more processes prior to being inspected with the inspection system, and wherein the output of the inspection system for the wafer and output of the inspection system for the at least one other wafer have variations in color.

4. The method of claim 1, wherein the output for the wafer generated by the inspection system has variations in color across the wafer.

5. The method of claim 1, wherein the standard reference image is generated based on one or more dies on one or more wafers.

6. The method of claim 1, wherein the standard reference image is generated by simulation software that uses wafer design data as input and outputs synthetic wafer images, and wherein the standard reference image indicates wafer structures but does not have the same gray-level values as test images generated for the wafer by the inspection system.

7. The method of claim 1, further comprising generating the standard reference image based on the output generated for the wafer by the inspection system, wherein the standard reference image is not used for other wafers.

8. The method of claim 1, further comprising generating the standard reference image based on the output generated for only a portion of the wafer by the inspection system, wherein the standard reference image is not used for other portions of the wafer.

9. The method of claim 1, wherein said classifying is based on the one or more determined attributes, one or more other attributes determined for the at least one of the defects based on a portion of a test image corresponding to the at least one of the defects, and one or more additional attributes determined for the at least one of the defects based on a portion of a difference image corresponding to the at least one of the defects.

10. The method of claim 1, further comprising generating the standard reference image for a single die on the wafer, wherein the standard reference image is not used for other die on the wafer.

11. The method of claim 1, further comprising generating the standard reference image by determining one or more first histograms of one or more frame images in a reference image of a die on the wafer, determining one or more second histograms of one or more frame images in a median image generated for the wafer from the output generated by the inspection. system, modifying the one or more second histograms so that the one or more second histograms substantially match the one or more first histograms, and generating the standard reference image based on the one or more modified second histograms.

12. The method of claim 11, wherein the reference image is an image of a single die on the wafer.

13. The method of claim 11, wherein the reference image is a composite image of multiple dies on the wafer.

14. The method of claim 11, wherein detecting the defects further comprises assigning different portions of a test image for the wafer to different segments based on the standard reference image, and wherein one or more parameters of said detecting performed for the different segments are different.

15. The method of claim 11, wherein determining the one or more first histograms comprises generating data for the one or more first histograms, and wherein modifying the one or more second histograms is performed with less than all of the data generated for the one or more first histograms.

16. The method of claim 1, wherein the standard reference image is wafer design data.

17. The method of claim 1, wherein the standard reference image is an image of wafer design data for the wafer generated by a scanning electron microscope.

18. The method of claim 1, further comprising generating the standard reference image by aligning multiple images to each other with sub-pixel accuracy and generating the standard reference image from the aligned multiple images.

19. The method of claim 1, Wherein detecting the defects further comprises aligning multiple images to each other with sub-pixel accuracy and detecting the defects based on the aligned multiple images.

20. A non-transitory computer-readable medium, storing program instructions executable on a computer system for performing a computer-implemented method for classifying defects detected on a wafer, wherein the computer-implemented method comprises:
    detecting defects on a wafer based on output generated for the wafer by an inspection system, wherein detecting the defects comprises determining median intensity as a function of within die position based on the output generated by the inspection system for two or more dies on the wafer, determining difference values by subtracting a characteristic of individual pixels in the output for a reference die on the wafer from the characteristic of their corresponding pixels in the output for a test die on the wafer, generating a two-dimensional scatter plot of the difference values and the median intensity corresponding to substantially the same locations, and detecting the defects based on the two-dimensional scatter plot;
    determining one or more attributes for at least one of the defects based on portions of a standard reference image corresponding to the at least one of the defects, wherein the standard reference image is a defect free image; and
    classifying the at least one of the defects based at least in part on the one or more determined attributes.

21. A system configured to classify defects detected on a wafer, comprising:
    an inspection subsystem configured to generate output for a wafer by scanning light over the wafer and detecting light from the wafer during the scanning; and
    a computer subsystem configured for:
        detecting defects on a wafer based on the output generated for the wafer by the inspection subsystem, wherein detecting the defects comprises determining median intensity as a function of within die position based on the output generated by the inspection subsystem for two or more dies on the wafer, determining difference values by subtracting a characteristic of individual pixels in the output for a reference die on the wafer from the characteristic of their corresponding pixels in the output for a test die on the wafer, generating a two-dimensional scatter plot of the difference values and the median intensity corresponding to substantially the same locations, and detecting the defects based on the two-dimensional scatter plot;
        determining one or more attributes for at least one of the defects based on portions of a standard reference image corresponding to the at least one of the defects, wherein the standard reference image is a defect free image; and
        classifying the at least one of the defects based at least in part on the one or more determined attributes.

22. The system of claim 21, wherein said classifying comprises determining if the at least one of the defects is a defect of interest or a nuisance.

23. The system of claim 21, wherein the wafer and at least one other wafer were subject to the same one or more processes prior to being inspected with the inspection subsystem, and wherein the output of the inspection subsystem for the wafer and output of the inspection subsystem for the at least one other wafer have variations in color.

24. The system of claim 21, wherein the output for the wafer generated by the inspection subsystem has variations in color across the wafer.

25. The system of claim 21, wherein the standard reference image is not generated based on a single die on a single wafer.

26. The system of claim 21, wherein the standard reference image is different than a reference image generated from a single die on a single wafer.

27. The system of claim 21, wherein the computer subsystem is further configured for generating the standard reference image based on the output generated for the wafer by the inspection subsystem, and wherein the standard reference image is not used for other wafers.

28. The system of claim 21, wherein the computer subsystem is further configured for generating the standard reference image based on the output generated for only a portion of the wafer by the inspection subsystem, and wherein the standard reference image is not used for other portions of the wafer.

29. The system of claim 21, wherein said classifying is based on the one or more determined attributes, one or more other attributes determined for the at least one of the defects based on a portion of a test image corresponding to the at least one of the defects, and one or more additional attributes determined for the at least one of the defects based on a portion of a difference image corresponding to the at least one of the defects.

30. The system of claim 21, wherein the computer subsystem is further configured for generating the standard reference image for a single die on the wafer, and wherein the standard reference image is not used for other die on the wafer.

31. The system of claim 21, wherein the computer subsystem is further configured for generating the standard reference image by determining one or more first histograms of one or more frame images in a reference image of a die on the wafer, determining one or more second histograms of one or more frame images in a median image generated for the wafer from the output generated by the inspection subsystem, modifying the one or more second histograms so that the one or more second histograms substantially match the one or more first histograms, and generating the standard reference image based on the one or more modified second histograms.

32. The system of claim 31, wherein the reference image is an image of a single die on the wafer.

33. The system of claim 31, wherein the reference image is a composite image of multiple dies on the wafer.

34. The system of claim 31, wherein detecting the defects further comprises assigning different portions of a test image for the wafer to different segments based on the standard reference image, and wherein one or more parameters of said detecting performed for the different segments are different.

35. The system of claim 31, wherein determining the one or more first histograms comprises generating data for the one or more first histograms, and wherein modifying the one or more second histograms is performed with less than all of the data generated for the one or more first histograms.

36. The system of claim 21, wherein the standard reference image is wafer design data.

37. The system of claim 21, wherein the standard reference image is an image of wafer design data for the wafer generated by a scanning electron microscope.

38. The system of claim 21, wherein the computer subsystem is further configured for generating the standard reference image by aligning multiple images to each other with sub-pixel accuracy and generating the standard reference image from the aligned multiple images.

39. The system of claim 21, wherein detecting the defects further comprises aligning multiple images to each other with sub-pixel accuracy and detecting the defects based on the aligned multiple images.

40. A system configured to classify defects detected on a wafer, comprising:
an inspection subsystem configured to generate output for a wafer by scanning light over the wafer and detecting light from the wafer during the scanning; and
a computer subsystem configured for:
detecting defects on a wafer based on the output generated for the wafer by the inspection subsystem, wherein detecting the defects comprises determining median intensity as a function of within die position based on a standard reference image, combining the output for two or more test dies on the wafer, determining difference values by subtracting a characteristic of individual pixels in the standard reference image from the characteristic of their corresponding pixels in the combined output for the two or more test dies, generating a two-dimensional scatter plot of the difference values and the median intensity corresponding to substantially the same locations, and detecting the defects based on the two-dimensional scatter plot;
determining one or more attributes for at least one of the defects based on portions of the standard reference image corresponding to the at least one of the defects, wherein the standard reference image is a defect free image; and
classifying the at least one of the defects based at least in part on the one or more determined attributes.

41. A system configured to classify defects detected on a wafer, comprising:
an inspection subsystem configured to generate output for a wafer by scanning light over the wafer and detecting light from the wafer during the scanning; and
a computer subsystem configured for:
detecting defects on a wafer based on the output generated for the wafer by the inspection subsystem, wherein detecting the defects comprises determining median intensity as a function of within die position based on the output generated by the inspection subsystem for two or more dies on the wafer, determining difference values by subtracting a characteristic of individual pixels in the output for a reference die on the wafer from the characteristic of their corresponding pixels in the output for a test die on the wafer, separating the pixels in the output for the test die into segments determined from a standard reference image, for at least one of the segments, generating a two-dimensional scatter plot of the difference values and the median intensity in the at least one segment corresponding to substantially the same locations, and detecting the defects based on the two-dimensional scatter plot;
determining one or more attributes for at least one of the defects based on portions of the standard reference image corresponding to the at least one of the defects, wherein the standard reference image is a defect free image; and
classifying the at least one of the defects based at least in part on the one or more determined attributes.

42. A system configured to classify defects detected on a wafer, comprising:
an inspection subsystem configured to generate output for a wafer by scanning light over the wafer and detecting light from the wafer during the scanning; and
a computer subsystem configured for:
detecting defects on a wafer based on the output generated for the wafer by the inspection subsystem;
determining one or more attributes for at least one of the defects based on portions of a standard reference image corresponding to the at least one of the defects, wherein the standard reference image is a defect free image, and wherein the computer subsystem is further configured for generating the standard reference image by determining one or more first histograms of one or more frame images in a reference image of a die on the wafer, determining one or more second histograms of one or more frame images in a median image generated for the wafer from the output generated by the inspection subsystem, modifying the one or more second histograms so that the one or more second histograms substantially match the one or more first histograms, and generating the standard reference image based on the one or more modified second histograms; and
classifying the at least one of the defects based at least in part on the one or more determined attributes.

43. The system of claim 42, wherein the reference image is an image of a single die on the wafer.

44. The system of claim 42, wherein the reference image is a composite image of multiple dies on the wafer.

45. The system of claim 42, wherein detecting the defects comprises assigning different portions of a test image for the wafer to different segments based on the standard reference image, and wherein one or more parameters of said detecting performed for the different segments are different.

46. The system of claim 42, wherein determining the one or more first histograms comprises generating data for the one or more first histograms, and wherein modifying the one or more second histograms is performed with less than all of the data generated for the one or more first histograms.

47. A method for classifying defects detected on a wafer, comprising:
detecting defects on a wafer based on output generated for the wafer by an inspection system, wherein detecting the defects comprises determining median intensity as a function of within die position based on a standard reference image, combining the output for two or more test dies on the wafer, determining difference values by subtracting a characteristic of individual pixels in the standard reference image from the characteristic of their corresponding pixels in the combined output for the two or more test dies, generating a two-dimensional scatter plot of the difference values and the median intensity corresponding to substantially the same locations, and detecting the defects based on the two-dimensional scatter plot;

determining one or more attributes for at least one of the defects based on portions of the standard reference image corresponding to the at least one of the defects, wherein the standard reference image is a defect free image; and classifying the at least one of the defects based at least in part on the one or more determined attributes, wherein said detecting, said determining, and said classifying is performed by a computer system.

48. A method for classifying defects detected on a wafer, comprising:

detecting defects on a wafer based on output generated for the wafer by an inspection system, wherein detecting the defects comprises determining median intensity as a function of within die position based on the output generated by the inspection system for two or more dies on the wafer, determining difference values by subtracting a characteristic of individual pixels in the output for a reference die on the wafer from the characteristic of their corresponding pixels in the output for a test die on the wafer, separating the pixels in the output for the test die into segments determined from a standard reference image, for at least one of the segments, generating a two-dimensional scatter plot of the difference values and the median intensity in the at least one segment corresponding to substantially the same locations, and detecting the defects based on the two-dimensional scatter plot;

determining one or more attributes for at least one of the defects based on portions of the standard reference image corresponding to the at least one of the defects, wherein the standard reference image is a defect free image; and classifying the at least one of the defects based at least in part on the one or more determined attributes, wherein said detecting, said determining, and said classifying is performed by a computer system.

49. A method for classifying defects detected on a wafer, comprising:

detecting defects on a wafer based on output generated for the wafer by an inspection system;

generating a standard reference image by determining one or more first histograms of one or more frame images in a reference image of a die on the wafer, determining one or more second histograms of one or more frame images in a median image generated for the wafer from the output generated by the inspection system, modifying the one or more second histograms so that the one or more second histograms substantially match the one or more first histograms, and generating the standard reference image based on the one or more modified second histograms;

determining one or more attributes for at least one of the defects based on portions of the standard reference image corresponding to the at least one of the defects, wherein the standard reference image is a defect free image; and classifying the at least one of the defects based at least in part on the one or more determined attributes, wherein said detecting, said generating, said determining, and said classifying is performed by a computer system.

50. The method of claim 49, wherein the reference image is an image of a single die on the wafer.

51. The method of claim 49, wherein the reference image is a composite image of multiple dies on the wafer.

52. The method of claim 49, wherein detecting the defects comprises assigning different portions of a test image for the wafer to different segments based on the standard reference image, and wherein one or more parameters of said detecting performed for the different segments are different.

53. The method of claim 49, wherein determining the one or more first histograms comprises generating data for the one or more first histograms, and wherein modifying the one or more second histograms is performed with less than all of the data generated for the one or more first histograms.

* * * * *